United States Patent [19]
Colwell et al.

[11] Patent Number: 5,574,942
[45] Date of Patent: Nov. 12, 1996

[54] HYBRID EXECUTION UNIT FOR COMPLEX MICROPROCESSOR

[75] Inventors: Robert P. Colwell, Portland; David B. Papworth, Beaverton; Michael A. Fetterman; Andrew F. Glew, both of Hillsboro; Glenn J. Hinton, Portland; Stephen M. Coward, Aloha; Grace C. Chen, Portland, all of Oreg.

[73] Assignee: Intel Corporation, Santa Clara, Calif.

[21] Appl. No.: 602,254

[22] Filed: Feb. 15, 1996

Related U.S. Application Data

[63] Continuation of Ser. No. 202,797, Feb. 28, 1994, abandoned.
[51] Int. Cl.⁶ .................................................. G06F 9/30
[52] U.S. Cl. .................. 395/800; 395/376; 364/DIG. 7; 364/931.11; 364/931.52; 364/931.1; 364/933.6; 364/933.62
[58] Field of Search ................................. 395/800, 375

[56] References Cited

U.S. PATENT DOCUMENTS 4,847,755  7/1989  Morrison et al. ................. 395/800
5,361,373  11/1994  Gilson ................................ 395/800
5,519,864  5/1996  Mantell et al. ..................... 395/650

OTHER PUBLICATIONS

Popescu, et al., "The Metaflow Architecture," IEEE Micro, pp. 10–13 and 63–73, Jun. 1991.
Intel, "i750, i860, i960 Processors and Related Products", 1993, pp. 2–1–2–47 and pp. 3–234–3–245.
Pleszkun et al. "WISQ: A Restartable Architecture Using Queues" 1987.
Gillom et al.; "Design and Architecture for a Multi-Mode Pipelined, Floating Point Adder", 73–76, Feb. 1991.
Mahon et al. "Hewlett–Packard Precision Architecture: The Processor"; 4–22; Aug. 1986.
Patt et al., "HPS, A New Microarchitecture: Rationale and Introduction"; 103–108; 1985.

Primary Examiner—Larry D. Donaghue
Attorney, Agent, or Firm—Blakely, Sokoloff, Taylor & Zafman

[57] ABSTRACT

A hybrid execution unit for executing miscellaneous instructions in a single clock cycle. The execution unit receives either integer or floating point data, and performs manipulations of two incoming sources to produce a result source in conjunction with existing integer and floating point execution units.

29 Claims, 5 Drawing Sheets

| X | X | O F | S F | Z F | A F | P F | C F | 32-bit Data Field |

*Figure 4(a)*

| | | | | | | 85 | 84    68 | 67    0 |
|---|---|---|---|---|---|---|---|---|
| Q 5 | F P F | F C 3 | F C 2 | F C 1 | F C 0 | Sign bit | 17-bit Exponent Data | 68-bit Mantissa Data 65 |

HYBRID EXECUTION UNIT FOR COMPLEX MICROPROCESSOR

This is a continuation of application No. 08/202,797, filed Feb. 28, 1994, now abandoned.

BACKGROUND OF THE INVENTION

1. Field of the Invention

The present invention relates to the field of microprocessor architecture. More specifically, the present invention relates to a hybrid execution unit for use in microprocessors to increase instruction throughput in complex microprocessors.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instruction until the condition is resolved. Since the condition will not be resolved until further down the pipeline, the instruction fetch unit may not be able to fetch proper instructions.

To overcome this problem, many pipelined microprocessors use branch prediction mechanisms that predict the outcome of branches and then fetch subsequent instructions according to branch prediction. Branch prediction is achieved using a branch target buffer (BTB) to store the history of a branch instruction based upon the instruction pointer or address of that instruction. Every time a branch instruction is fetched, the branch target buffer predicts the target address of the branch using the branch history. Speculative execution is where instructions are initiated and completed before knowing if they are the correct instructions. This usually includes prediction with a BTB.

In addition to speculative execution, substantial increases in instruction throughput are achievable by implementing out-of-order dispatch of instructions to the execution units. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design* and Prentice-Hall, Inc., 1991, Chapters 3 and 7.

Since the advent of the microprocessor industry, one architecture has emerged as the dominant standard in the marketplace. This is the Intel Architecture Microprocessor. The Intel Architecture Microprocessor was one of the earliest general purpose microprocessors that facilitated the proliferation of computers to the extent that they are in use today. The architecture has proceeded through many generations of new designs, each providing more power and greater speed than the previous.

With each new generation of the Intel Architecture Microprocessor, it has been important to maintain compatibility with software designed for earlier generations of processors. This assures an existing customer base a compatible upgrade path in a highly competitive computer marketplace in which many millions of computers powered by Intel Architecture Microprocessors are in existence. It is this existing customer base which cannot be ignored as new architectural design philosophies are implemented.

As was described above, radical changes have taken place in the world of microprocessor architecture to increase speed and performance. The concepts described above greatly increase the speed and performance available for microprocessors. However, the need to maintain compatibility between newer and older designs becomes ever more complicated. In the never ending effort for greater speed and more power, it is often necessary to internally manipulate data to assure the compatibility requirements with prior generations of processors are met.

As with most microprocessors, the Intel Architecture Microprocessor implements different execution units for performing integer and floating point operations. One reason for this is that integer operations may be carried out very quickly. Additionally, for most applications the integer operations dominate the number of operations overall. Separating integer and floating point execution units provides for a faster executing pipeline overall. Some of the internal data manipulations required for maintaining compatibility between new and old processor designs lend themselves well to incorporation within existing integer or floating point execution unit designs. However, many do not. While it is possible to have microcode manipulate data for processing by existing execution units, this may introduce execution latencies for what otherwise might be simple operations.

In addition to operations that promote compatibility between older and newer designs, other operations that do not fit naturally into either integer execution units or floating point execution units are often desirable to have implemented. Again, manipulations of data can be performed with microcode driving existing execution units. However, with higher demands for execution speed, the latency introduced by such operations may prove unacceptable. Accordingly, it would be desirable, and is therefore an object of the present invention to provide a mechanism for rapid execution of hybrid instructions not necessarily suited for inclusion in existing integer or floating point execution units.

SUMMARY OF THE INVENTION

From the foregoing it can be appreciated that there is a need to provide a mechanism for the execution of various instructions that may not be suited for implementation in traditional integer or floating point execution units. Therefore, it is an object of the present invention to provide an execution unit for the processing of hybrid instructions which provides a high rate of instruction throughput in a microprocessor.

These and other objects of the present invention are provided by a hybrid execution unit implemented to perform specific instructions not necessarily suited for inclusion in traditional integer or floating point execution units. The preferred embodiment hybrid execution unit is implemented in a speculative out-of-order execution microprocessor, but should be deemed to be generally applicable. The hybrid execution unit provides various functionality and supports multiple data types. The preferred embodiment hybrid execution unit receives data sources that are the same size as floating point data sources so that both floating point data and integer data may be manipulated. The hybrid execution unit shares the same dispatch port from the instruction buffer as one of the integer execution units and the floating point execution cluster. The hybrid execution unit also shares the same write back bus as those execution units. Further, the hybrid execution unit may bypass information to other execution units for efficient scheduling of operations.

In the preferred embodiment microprocessor implementing the hybrid execution unit, integer instructions are carried out by integer execution units in a single system clock cycle. The floating point execution units have greater latency depending on the operation to be carried out. The hybrid execution unit, though it takes floating-point size data source inputs, executes its instructions in a single clock cycle. Thus, though many of the instructions to be carried out by the hybrid execution unit are ones that microcode might manipulate via other execution units, microcode in many instances could not perform the instructions with the single cycle throughput of the hybrid execution unit. The hybrid execution unit includes the necessary control logic for directing the data path to perform the various data manipulations or swizzling that are described with respect to the implemented instructions.

BRIEF DESCRIPTION OF THE DRAWINGS

The objects, features and advantages of the present invention will be apparent from the following detailed description in which.

DETAILED DESCRIPTION OF THE INVENTION

The present invention provides a hybrid execution unit which performs single cycle execution for manipulating data of either integer or floating point data types. In the following description, numerous specific details are set forth such as particular instruction layouts and specified couplings for a preferred embodiment implementation in order to provide a thorough understanding of the present invention. It will be appreciated, however, by one skilled in the art that the present invention may be practiced in a more general application where such advantages provided by the present invention are desired. In other instances, well-known control structures and gate level circuits have not been shown in detail in order not to obscure important aspects of the present invention. Particularly, many functions are described to be carried out by various logic and multiplexing circuits. Once the various functions have been described, a practitioner of ordinary skill in the art will be able to implement the necessary logic and multiplexing circuits without undue experimentation.

Figure 1:
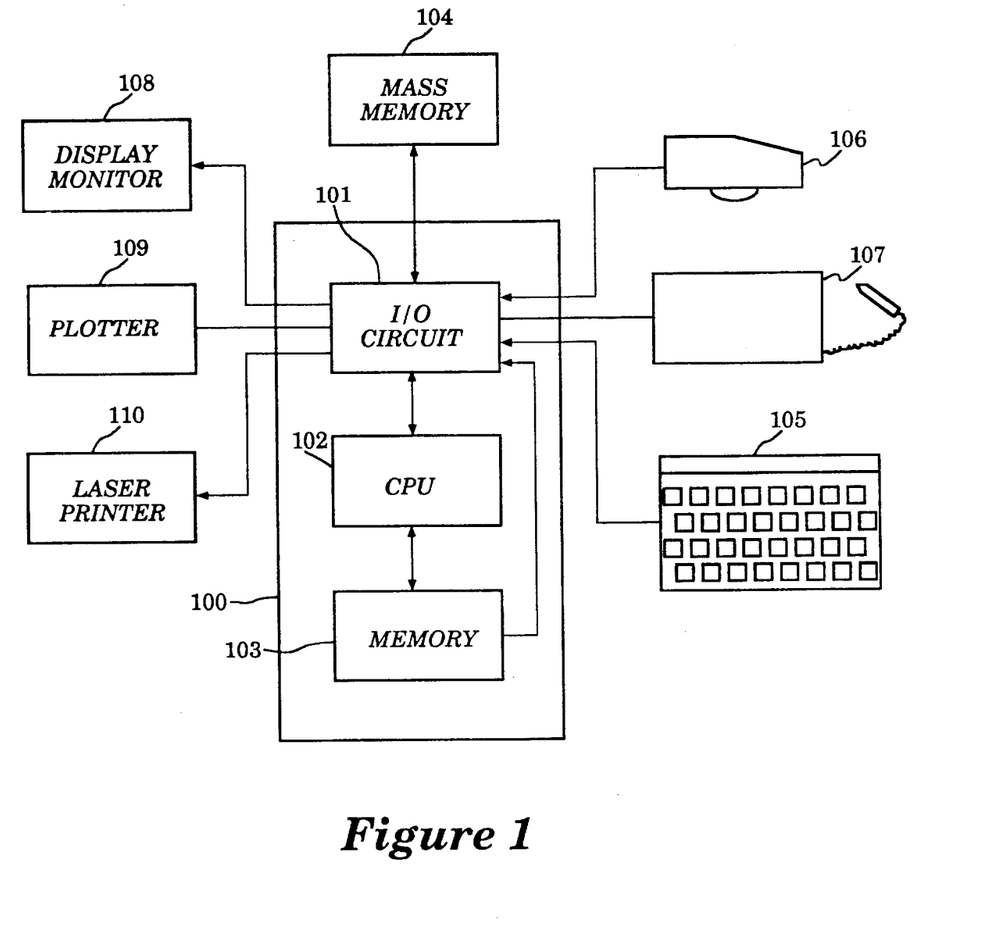
FIG. 1 illustrates a basic computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The preferred embodiment of the present invention is intended to be implemented in a microprocessor that executes the well-known Intel Architecture Microprocessor instruction set. The present invention may, however, be implemented in any microprocessor architecture in which a reservation station is utilized for storing instructions until data and resource dependencies are resolved. A variety of microprocessors may take advantage of the present invention whether those microprocessors occupy a single chip or more than one and regardless of the materials used to fabricate the chip including silicon or gallium arsenide.

Figure 2:
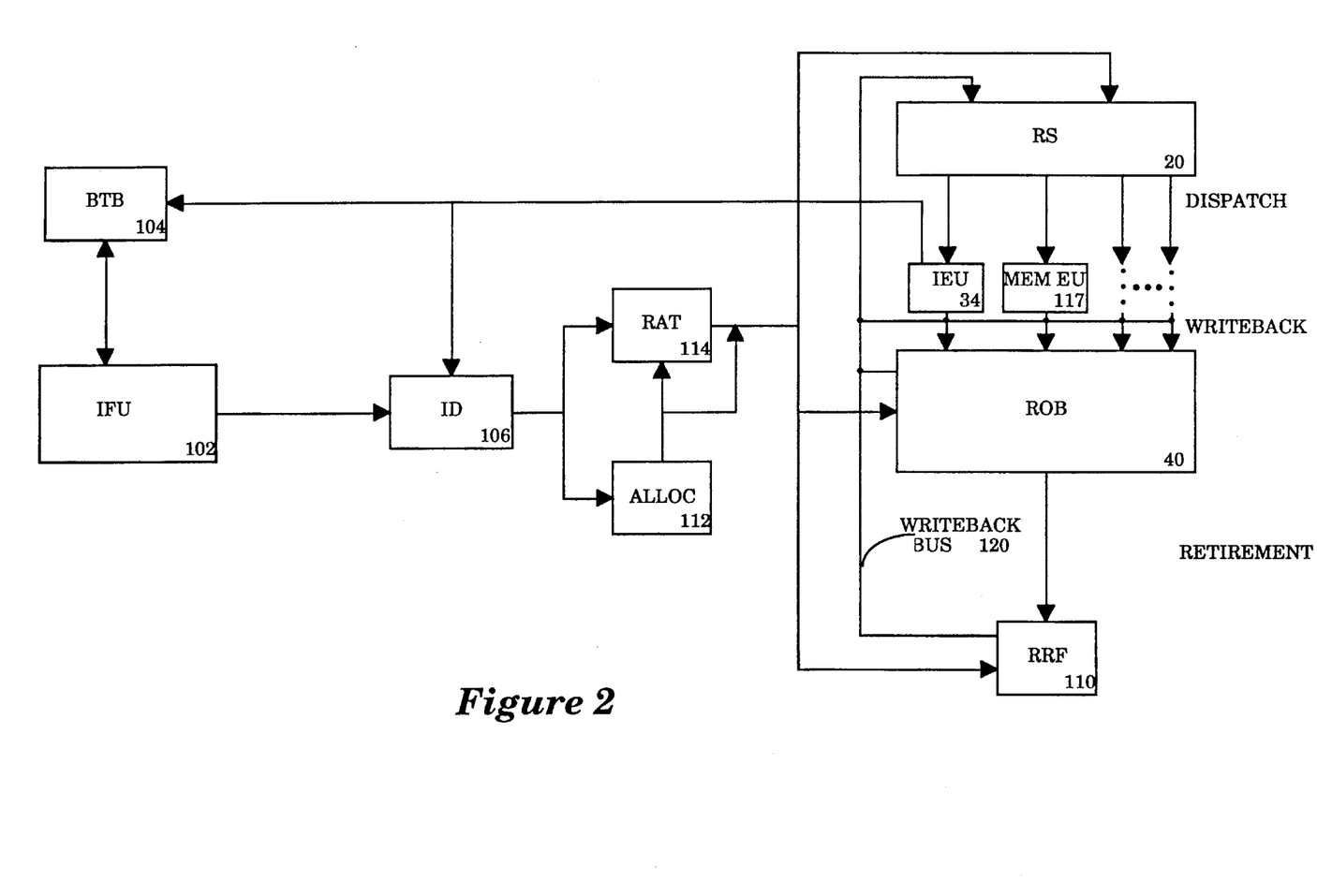
FIG. 2 is a block diagram illustrating a portion of a microprocessor incorporating the present invention.

The microprocessor of the present invention, prior to executing Intel Architecture Microprocessor instructions, decodes them into a more simple, stylized sequence of "micro operations." The micro operations are then analyzed and scheduled according to resolved dependencies thus implementing out-of-order execution. The sequence below shows the mapping of instructions of the Dhrystone trace into their constituent micro operations ("Gn" is general register n):

tions by the instruction decoder 106. Such a decoding mechanism is found in the Intel Microprocessor Architectures. The instruction decoder 106 transfers the stream of micro operations to a register alias table (RAT) 114 and an allocator (ALLOC) 112. In one embodiment, the instruction decoder 106 issues up to three in-order micro operations during each cycle of the processor.

The allocator 112 assigns each incoming micro operation to a location in the reorder buffer (ROB) 40, thereby mapping the logical destination address (LDST) of the micro operation to a corresponding physical destination address (PDST) in the ROB. A register alias table (RAT) 114 maintains this mapping.

The contents of a ROB register are retired to a location in a real register file (RRF) 110. The RAT 114 thus also stores a real register file valid bit (RRFV) that indicates whether the value indicated by the logical address is to be found at the physical address in the ROB or in the RRF after retirement. Based upon this mapping, the RAT 114 also associates every logical source address to a corresponding location in the ROB or the RRF (the source operand of one instruction generally must have been the destination of a previous instruction).

Each incoming micro operation is also assigned and written into an entry in the reservation station 20 by the allocator 112. The reservation station (RS) 20 assembles the micro operations awaiting execution by an appropriate execution unit, such as integer execution unit (IEU) 34 or memory execution unit (MEM EU) 117.

Figure 3:
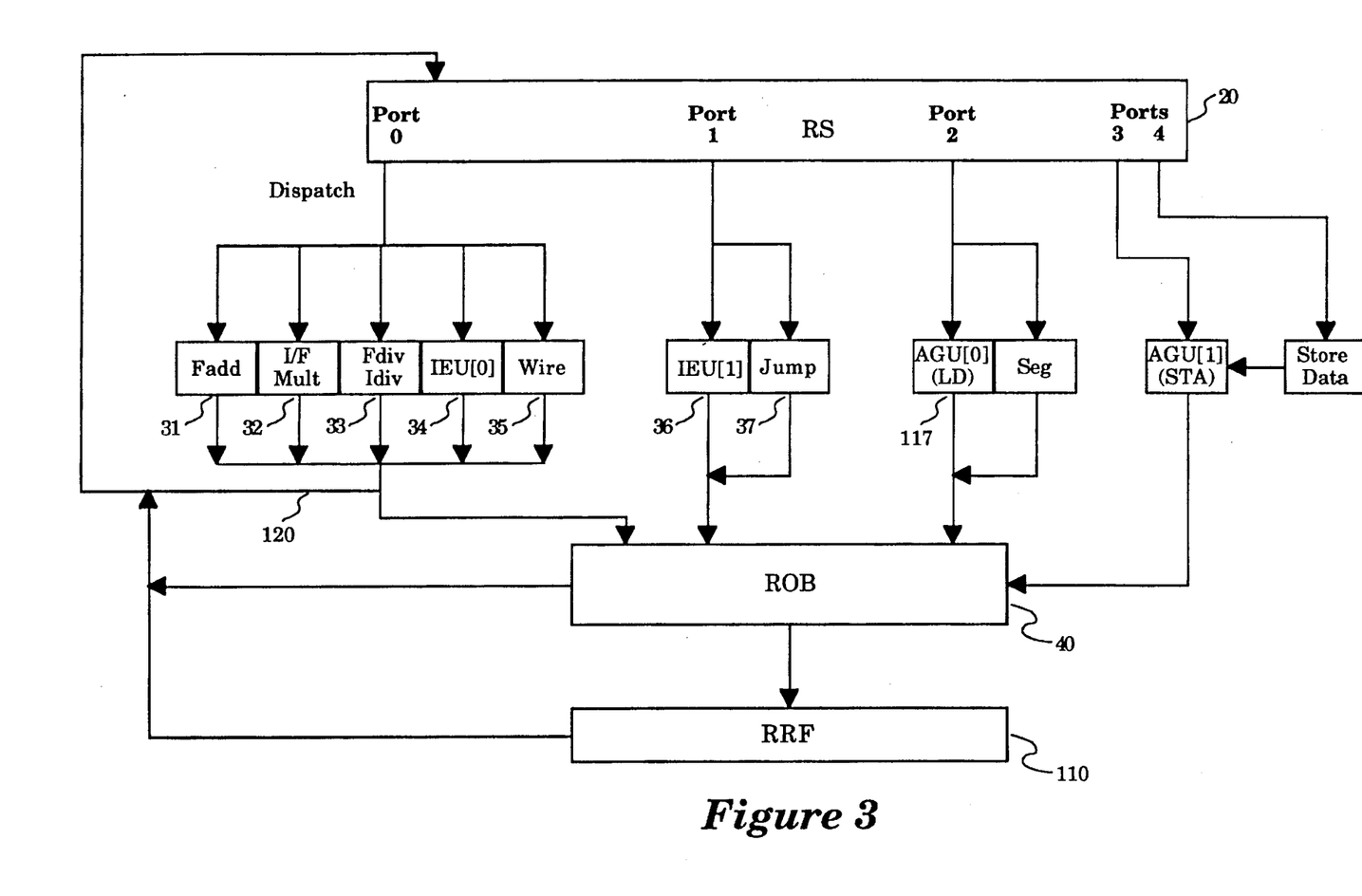
FIG. 3 illustrates a more detailed block diagram of the out-of-order core of a microprocessor incorporating a preferred embodiment of the present invention.

FIG. 3 illustrates a more detailed portion of the microprocessor incorporating the present invention. The microprocessor implementing the preferred embodiment of the present invention utilizes out-of-order execution of instruc-

| Intel Architecture Instructions | micro operations |
| --- | --- |
| 000014e8: PUSHw BP <TOS fbfffc3c> | STw IN (G5, G4) OUT (Memfbfffc3c) |
|  | SUB IN (SPO, CO) OUT (SPO) |
| 000014e9: MOVw EA, R ESP EBP | MVw IN (G4) OUT (G5) |
| 000014eb: LEAVE <TOS fbfffc3c> | ADD IN (G5, CO) OUT (G4) |
|  | LDw IN (G5, Memfbfffc3c) OUT (G5) |
| 000014ec: RETn | LDw IN (G4, Memfbfffc40) OUT (TO) |
|  | ADD IN (SPO, CO) OUT (SPO) |
|  | JMP IN (TO) OUT ( ) |
| 00001625: XORw EA, R EDI EDI | XOR IN (G7, G7) OUT (G7) |
| 00001625: ADDw Ib, EA ESP <IMM 18> | ADD IN (G4) OUT (G4, flags 0) |

It can be seen that the PUSH of the BP register is converted into two micro operations. The first performs the store of the register and the second adjusts the stack pointer. These two micro operations are not dependent on each other. The "microcode" corresponding to the PUSH has been written explicitly to allow maximal parallelism wherever possible. It can be seen that some complex instructions translate into multiple micro operations which may or may not be related to one another, and simple instructions map directly into a unique micro operation (such as XOR or ADD).

FIG. 2 is a block diagram of an embodiment of a speculative out-of-order processor in accordance with the present invention. The processor comprises an instruction fetch unit (IFU) 102 coupled to a branch target buffer (BTB) 104 and an instruction decoder (ID) 106. Based upon the instruction pointer (IP) provided by the BTB 104 to the IFU 102, the IFU 102 fetches the macro instruction found at the address in memory (not shown) that is indicated by the IP. The instruction is decoded into one or more micro operations. The portion of the microprocessor illustrated in FIG. 3 can be considered the out-of-order core of the microprocessor. The first element of the out-of-order core illustrated in FIG. 3 is the reservation station 20. The reservation station 20 is a buffer in front of the functional units that holds micro operations that are waiting for needed resources in order to execute. These needed resources include the source data operands (that previous micro operations may not yet have created) and a functional unit with which to execute the micro operation.

The reservation station performs several functions. Its data fields serve as a temporary buffer for instructions and the source data that is or will be available. The reservation station maintains waiting instructions and is "watching" all the result/write back buses from all the execution interfaces "looking" for source data that it needs for its micro operations. When the watched-for data arrives on the result bus, the reservation station writes it into the appropriate source data field.

Once all the source operands for a micro operation are in the reservation station, the reservation station determines when an appropriate execution unit is available and schedules the data ready micro operation for dispatch. It is the scheduling of micro operation dispatch which concerns the present invention.

The reservation station 20 of FIG. 3 is illustrated having five dispatch ports. Primarily, micro operations in the embodiment illustrated will be dispatched over either Dispatch Port 0 or Dispatch Port 1. In the preferred embodiment microprocessor, there are five execution units coupled to Dispatch Port 0 from reservation station 20. These are the floating point add unit 31, the multiply unit 32 for performing integer and floating point multiplies, integer and floating point divide unit 33, integer execution unit 34, and a hybrid execution unit 35. As was described, the complex Intel Microprocessor instruction set is reduced to a simpler stream of micro operations. These micro operations, when they are dispatched from the reservation station, are operated on by the various execution units. Most applications heavily utilize the integer execution unit. Integer execution unit 34 is designed to be able to process data-ready micro operations in one clock cycle. It is therefore referred to as a single-cycle functional unit. The integer execution unit 34 receives data having a width of 32 bits. The floating point execution units 31, 32 and 33 carry out more complicated tasks when they receive data-ready micro operations. These functional units receive input streams having a width for 86 bits of source data.

In the preferred embodiment of the present invention microprocessor, a floating point add requires three clock cycles to execute, and a floating point multiply requires five clock cycles to execute. Floating point divides and square roots, which are both carried out by the floating point divide unit 33, have variable length latencies depending upon the precision required for their result. The wire unit 35 is a hybrid execution unit implemented in the preferred embodiment for various other instructions. It is similar to a floating point unit in that its input stream takes sources that are 86 bits wide, but it is more like an integer execution unit in that it performs its operations in a single clock cycle.

Dispatch port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro operations common in most code, thereby enhancing performance of the overall system. Of course, alternative microprocessors may incorporate more or fewer execution units depending upon design objectives.

After an execution unit executes a micro operation, it writes back the result to the reorder buffer 40 over write back bus 120. The reorder buffer 40 serves as the place where the results of out-of-order operations are collected so that they can later be committed to machine state in strict von Neumann order the committed state registers being in the RRF 110. Thus, the reorder buffer is where the out-of-order core reassembles the instruction stream into its program order, before commitment to state. At the same time that execution units write back to the reorder buffer 40, they may simultaneously write back to the reservation station 20. It may be that the result of an execution unit's operation provides a source operand needed for the execution of another micro operation waiting in the reservation station. Similarly, a result from one execution unit may be immediately bypassed to another, or the same execution unit if a dependent instruction has already been dispatched.

The following description concerns details of the hybrid execution unit 35. This unit may also be referred to as the system's wire unit because the nature of many of the manipulations performed by the unit are related to wire signal manipulations. The microprocessor of the present invention includes the hybrid execution unit 35 for a number of purposes. One of the primary motivations is to maximize the execution speed of the microprocessor. It was found during the development of the preferred embodiment implementation of the present invention microprocessor that there are specific types of instruction which are not directly suitable for inclusion into either the integer execution units or the floating point execution units. Although it is possible through the use of microcode to perform many of the manipulations desired using the existing execution units, the time delay introduced by such a procedure may be unacceptable. The hybrid execution unit 35 is thus provided for handling these types of instructions so that microcode manipulations are unnecessary. Accordingly, instruction dispatch to the hybrid execution unit with appropriate source data will yield result data on the write back bus 120 in a single clock cycle. This is the same performance provided by the integer execution units 34 and 36. Thus, for some commonly executed instructions that are not properly at home in either the integer or floating point units, single clock cycle execution is achieved through implementation in the hybrid execution unit 35.

Figure 4A:
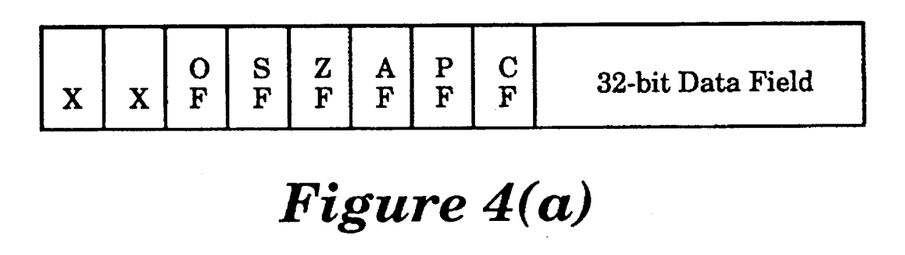
FIGS. 4(a) and 4(b) represent the bit assignments for internal data manipulated by the present invention.

In the preferred embodiment implementation of the hybrid execution unit, it was found advantageous to provide the execution unit with the capability of operating on either integer data or floating point data. It is useful to understand the layout of these data types in the present invention microprocessor because in addition to using the data fields of a source, the flags associated with the data may play an important role. Referring now to FIG. 4(a), the layout for the present invention integer data field is shown. The data format consists of a 32-bit data field and a flag field. In a preferred embodiment implementation, the flag field consists of 8 bits with 6 assigned and 2 left for future use. Each 32-bit data field contains the data stored in the integer registers, while the flag field contains the flag outputs from the last operation which wrote the register. The preferred embodiment flag designations are the following:

OF—Overflow Flag from operation

SF—Sign Flag from operation

ZF—Zero Flag from operation

AF—Auxiliary Carry Flag from operation

PF—Parity Flag from operation

CF—Carry Flag from operation.

The flags field may be used by some micro instructions as one of the inputs as a third source. For instance, the carry flag value in the flags field of the first operand of an "add with carry" micro instruction is used as the input to carry for the operation. Other such use will be described with respect to particular instructions carried out by the hybrid execution unit 35 further herein.

Figure 4B:
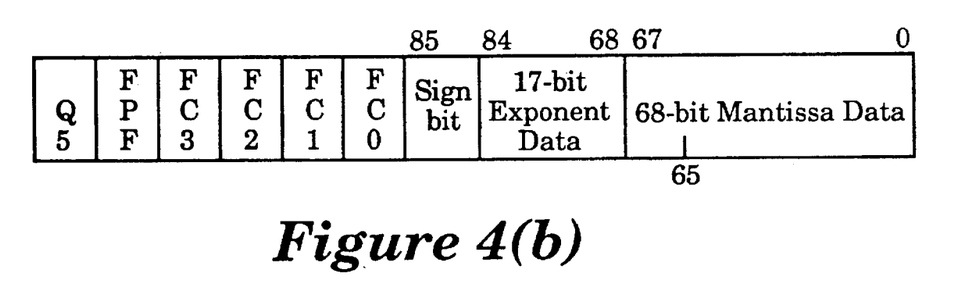

FIG. 4(b) illustrates the floating point data format implemented by the present invention. The floating point data format consists of an 86-bit data field of which the lower 68 bits are mantissa data and the next 17 bits comprise exponent data with one bit [85] designating the sign. There is also a 6-bit flags field. The data field contains the data stored in the floating point register in an internal floating point representation. The flags field normally contains the 4 floating-point condition code bits (FC3 to FC0) and a precision exception flag produced by output from the last operation which wrote the register. A sixth flag field is provided either for future use or because at least one instruction carried out by one of the floating point units uses the whole 6-bit flag field as a quotient field along with its normal floating point data result. The flags field and floating point data types will be discussed further herein as they are used with respect to particular instructions to be carried out by the logic of the hybrid execution unit 35.

The following will be a description of the instructions and data manipulations carried out by the hybrid execution unit 35. Following the description of implemented instructions, a preferred embodiment implementation of the unit's physical layout will be described. It should be understood that the instructions to be carried out by the hybrid execution unit are instructions that are implemented in the wire unit so as to facilitate single cycle execution of instructions that would otherwise require protracted manipulations through microcode implementation. Much of the logic to be described further herein is implemented for the controlling of multiplexing circuitry which performs the various data movement. Those of ordinary skill in the art may appreciate that other mechanisms may be implemented for performing these data manipulations and that the implementation described further herein is merely one advantageous approach.

The hybrid execution unit receives instructions, or opcodes, dispatched from the reservation station of the out-of-order core of the preferred embodiment microprocessor. With the opcode, comes the source data, either from the reservation station and/or through a bypassing mechanism (not shown) which provides data to the execution unit for manipulation. The hybrid execution unit may of course be implemented in a processor with other mechanisms for dispatching operations and data. The logic incorporated in the execution unit decodes the opcode provided and accordingly performs the manipulation defined for that operation on the source data received. When the execution unit completes execution of an instruction, it writes out result data the size of floating point data and sets the attendant flags for the data. Integer data results are written into the lower 32 bits of the result data portion of the result output. The following are the instructions executed by the preferred embodiment hybrid execution unit and the data manipulations to be carried out as a result.

In the following description, an instruction will be defined by an exemplary name for the instruction. Provided to the execution unit with the instruction will be data sources, source 1 and source 2. In the convention implemented by the preferred embodiment of the present invention, whenever flags are important, it will be the source 2 flag data that is considered. The data manipulations will usually comprise some manipulations between the source 1 and source 2 with a result being written out on the write back bus 120.

FANDNOT: This instruction performs the logical AND of the source 2 mantissa with the ones complement (NOT) of the source 1 mantissa. This is a bit-wise inversion and comparison between the source 2 mantissa and the source 1 mantissa. The bit-wise result for the mantissa is written out as the result data having appended thereto the sign and exponent data received with source 2. No flags are returned. The notational convention for this instruction is the following:

```
data out := src2[85] & src2[84:68] &
    (NOT src1[67:0] AND src2[67:0])
flags := '0
```

In this nomenclature, the single "&" indicates a concatenation operation. The "data out" formula thus means to assemble the result data word by taking bit 85 of source 2 and bits 84–68 of source 2 and concatenate them with the ones complement of bits 67–0 of source 1 ANDed with bits 67–0 of source 2. This notation will be used consistently throughout the description of the rest of the instructions carried out by the hybrid execution unit 35.

FCMOV: This operation receives as input the source 1 data, source 2 data and the source 2 flags. The output will be either the source 1 data or the source 2 data with no manipulations having been performed on the data itself. The selection of whether the source 1 data or the source 2 data is returned is dependent on the result of a logical operation performed on the values of the condition codes set in the source 2 flags. The condition may be defined so that a programmer knows how to set the flags to produce either a source 1 result or a source 2 result. The particular condition tested by the preferred embodiment of the present invention is the following table:

TABLE 1

FCMOV Conditions

| Modifier | Condition to choose Source 2 (bits [3:0] of Src2 flags) ('-' don't care ) |
|---|---|
| B | ---1 |
| NB | ---0 |
| E | 1--- |
| NE | 0--- |
| NBE | 0--0 |
| BE | 1--1 |
| BE | 0--1 |
| BE | 1--0 |
| NP | --0- |
| P | --1- |

The modifiers in the preferred embodiment are determined when the opcode is decoded upon receipt to the unit. The FCMOV instruction is very useful because it provides for a condition controlled result which does not require branching in the execution of an instruction. Thus, where it might require several clock cycles to perform a jump in testing a condition in software, by testing the condition codes in the hybrid execution unit, a solution may be provided in one clock cycle. The output flags are set to zero.

BSWAP: This instruction is a pneumonic for the integer operation bit swap. For this instruction, only source 1 is used. Source 1 is an integer data word with the data occupying the lower 32 bits of the 86 bits received. BSWAP converts a big/little endian number to be a little/big endian number by reversing the order of the least significant 4 bytes of data of source 1. The upper bits of data are forced to zero. No flags are returned. In the notation laid out above the instruction is as performed as follow:

```
data out := '0::54 & scr1[7:0] & scr1[15:8] &
    scr1[23:16] & scr1[31:24]
flags := '0
```

FCOM: This operation compares the value of source 2 to the value of source 1. The resulting data will be set to zero. The output flags will be set according to the following table:

TABLE 2

FCOM Condition Flags

| Condition | flags [3] | flags [2] | flags [1] | flags [0] |
|---|---|---|---|---|
| Greater than | 0 | 0 | 0 | 0 |
| Less than | 0 | 0 | 0 | 1 |
| Equal[a] | 1 | 0 | 0 | 1 |

[a]+0.0 and −0.0 are to be considered as equal.

FCALCTW: This instruction calculates a 2-bit tag word entry according to the source 1 floating point data type and the current tag word valid bit on source 2 (maintained at source 2, bit [0]). The floating point data type implemented by the present invention corresponds with the IEEE floating point data standard such that bits 67:65 contain the data type information for the source. In accordance with the convention, bit [67] is the overflow bit, bit [66] is the Jbit, and bit [65] is defined as the signal bit. The resulting tag word entry from the FCALCTW instruction is written into the lower 2 bits of the result data written back on the write back bus 120. If the current tag word valid bit on source 2 indicates empty ('0), then the output tag word is also empty ('11). Otherwise the resulting tag word is determined by the data type of source 1. If the source 1 data type is zero, the tag word is set to zero ('01). If the source 1 data type is normal, the tag word is set to valid ('00). If source 1 is any other data type, the tag word is set to special ('10). This instruction is useful for macro instructions that store Floating Point State to memory. It allows the tag word to not be maintained internally. The resulting tag word entry appears on bits [1:0] on the write back bus. The upper bits of data are forced to zero. No flags are returned. The operation is as follows:

```
data out := '0::84 &
    (IF src2[0] = EMPTY THEN EMPTY
     EF src1 dataT = ZERO THEN ZERO
     EF src1 dataT = NORMAL THEN ZERO ELSE
        SPECIAL)
flags := '0
```

FMERGE: The FMERGE instruction implements the store status word functionality of the present invention microprocessor. The floating point status word register contains the floating point units macrocode flags. The status word consists of the 4 floating point condition codes (FC3-FC0), a 3-bit top-of-stack (TOS) pointer, seven exception flag bits, an error summary bit and a busy bit. At this point it is worth noting that in addition to providing the opcode and source data and flags to the wire unit, the reservation station 20 is capable of propagating the 3-bit floating point top-of-stack pointer to the control logic of the hybrid execution unit 35. The source 1 data supplied with the FMERGE instruction contains the current floating point status word which in the implemented microprocessor, is maintained in the ROB 40. The reservation station sends the latest version of the floating point top-of-stack pointer to the unit 35. The latest version of the floating point condition flags appears on the source 2 flags bus. The FMERGE instruction merges these three sources. The supplied flags override the flags contained in the status word from the ROB. The upper bits of the result data are forced to zero. No flags are returned. The data operation is as follows:

```
data out := '0::70 & src1[15] & src2_flags[C3] &
    TOS_ptr & src2_flags[C2,C1,C0] & src1[7:0]
flags := '0
```

FMOV: This instruction simply passes the source 1 data to the register specified in the reservation station 20 for where the result write back is to be stored. No flags are returned. Essentially the instruction is as follows:

data out:=src1 [185:0]

flags:='0

FPORDATATYPE: This instruction expands the information found in the internally calculated data type and source bits [67:65] for source 2 and source 1 and then performs a logical OR of the two resulting decoded fields to produce combined decoded data. The instruction conditionally sets the lowest 8 bits of the result according to the source 1 and source 2 data types. FPORDATATYPE sets bits [7] if the fraction of either source is all zeroes. Bit [6] is set if either source is pseudo-denormal. Bit [5] is set if either source is denormal. Bit [4] is set if either source is infinity. Bit [3] is set if either source is unsupported. Bit [2] is set if either source is zero. Bit [1] is set if either bit is signaling NaN. Bit [0] is set if either bit is NaN. The upper bits of the result data are forced to zero. No flags are returned. Table 1 indicates the expansion provided based on data type for each source which are then subsequently OR'ed to produce the result described above in accordance with the following formula:

```
data out := '0::78 & (either src Fraction =
    '0::66?) & (either src PSEUDODEN?) & (either src
    DENORMAL?) & (either src INFINITY?) & (either
    src UNSUPPORTED?) & (either src ZERO?) & (either
    src SNaN?) & (either src NaN?)
flags := '0
```

TABLE 3

DATA TYPE COMBINING

| Date Type | | | | Decoded Data Type | |
|---|---|---|---|---|---|
| Exp. all 1's | Exp. all 0's | Fract. all 0's | source[67:65] (a '-' is a don't care) | Name | Bit Encoding |
| 0 | 0 | 0 | -0- | Unsupported | 0001000 |
| 0 | 0 | 0 | 01- | Normal | 0000000 |
| 0 | 0 | 1 | 00- | Unsupported | 0001000 |
| 0 | 0 | 1 | 01- | Normal | 0000000 |
| 0 | 1 | 0 | 00- | Denormal | 0100000 |
| 0 | 1 | 0 | 01- | Pseudo-denormal | 1100000 |
| 0 | 1 | 1 | 000 | Zero | 0000100 |
| 0 | 1 | 1 | 010 | Pseudo-denormal | 1100000 |
| 1 | 0 | 0 | 000 | Pseudo-SNaN | 0001000 |
| 1 | 0 | 0 | 001 | Pseudo-QNaN | 0001000 |
| 1 | 0 | 0 | 010 | SNaN | 0000011 |
| 1 | 0 | 0 | 011 | QNaN | 0000001 |
| 1 | 0 | 1 | 000 | Pseudo-infinity | 0001000 |
| 1 | 0 | 1 | 010 | Infinity | 0010000 |
| — | — | — | 100 | Unsupported | |

Figure 5:
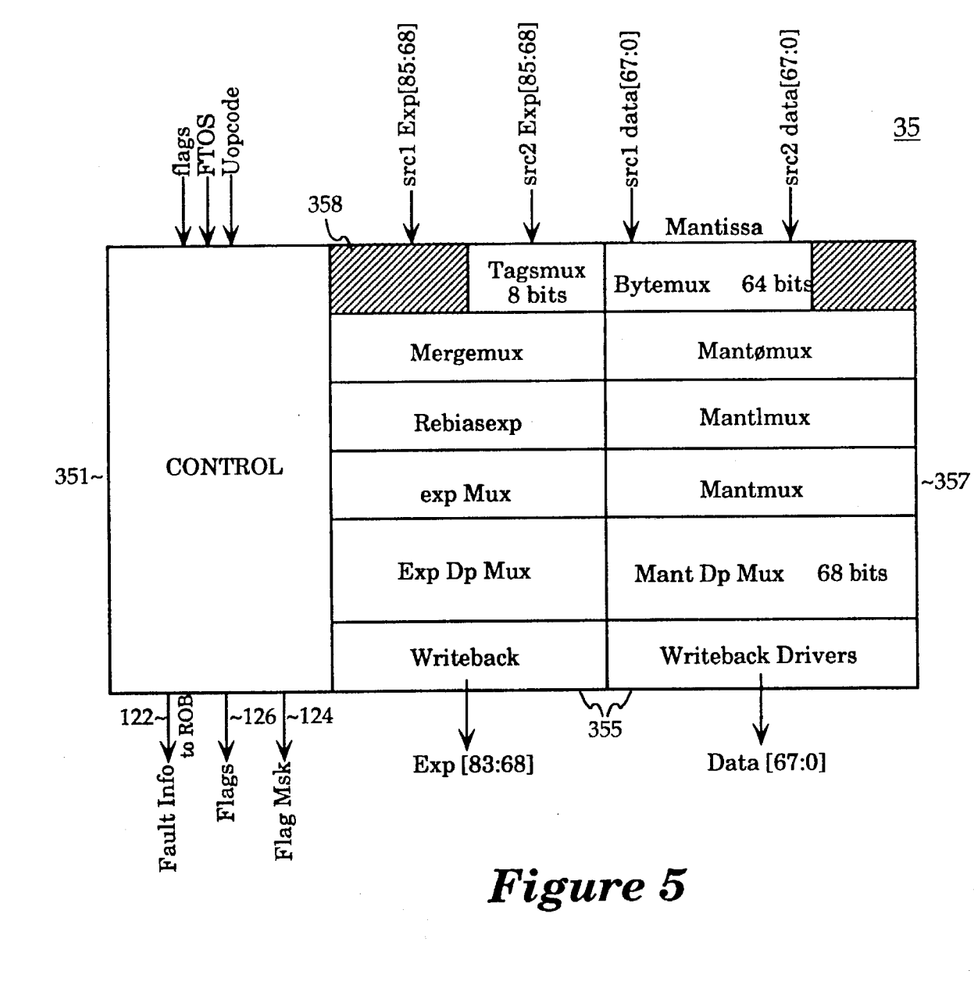
FIG. 5 illustrates a block diagram layout of the hybrid execution unit in accordance with a preferred embodiment of the present invention.

SIGEVENT: This instruction is used to write information out over the fault_info bus 122 (FIG. 5) provided between the execution unit and the ROB 40. The ROB 40, receiving fault_info that is non-zero processes through its event handling mechanisms the necessary activity based on the information on the fault_info bus 122. As presently implemented, SIGEVENT is the only instruction for which the hybrid execution unit 35 provides non-zero fault information to the ROB's fault_info field. The instruction passes exception information from the lower 8 bits of source 1 onto the fault_info bus 122. The result data written back from the hybrid execution unit 35 is the source 2 data with no flags being returned. The designation is as follows:

```
data out := src2[85:0]
flags := '0
faultinfo := scr1[7:0]
```

FXORS: This instruction performs the exclusive-OR of the sign bit [85] of source 2 and a sign bit [85] of source 1. The exponent and mantissa data of source 2 are returned. No flags are returned. The result data is set as follows:

```
data out := (scr1[85] XOR src2[85] & src2[84:68] &
    src2[67:0]
flags := '0
```

INTEXTRACT: This instruction returns portions of the source 2 input data right aligned to bit [0] of the result, according to the INTEXTRACT modifier. The HI32 modifier returns source 2 bits [63:32]. The HI16 modifier returns source 2 bits [31:16]. The UP32 modifier returns source 2 bits [66:35]. For each modifier, the upper data bits are forced to zero. The flags associated with the source 2 input data are returned. The result data is set as follows:

```
flags := src2 flags
INTEXTRACT.HI32
    data out := '0::54 & src2[63:32]
INTEXTRACT.HI16
    data out := '0::70 & src2[63:48]
INTEXTRACT.UP32
    data out := '0::54 & src2[66:35]
```

FPEXTRACT: This instruction right aligns portions of the source 2 input data to bit [0] of the result according to the FPEXTRACT modifier. The EXP17 modifier returns the source 2 exponent. The FLAGS modifier returns the flags associated with the source 2 input data. The DTYPE modifier returns the most significant 4 bits of the source 2 mantissa. The SIGN modifier returns the source 2 sign bit. The SEM2 modifier returns the source 2 sign, the least significant bit of the source 2 exponent and the two most significant bits of the source 2 fraction. The SEM4 modifier returns the source sign, the least significant bit of the source 2 exponent, and the four most significant bits of the source 2 fraction. The M5 modifier returns the two most significant bits of the source 2 fraction. For each modifier, the upper data bits are forced to zero. The flags associated with the source 2 input data are returned:

```
flags := src2 flags
FPEXTRACT.EXP17
    data out := '0::69 & src2[84:68]
FPEXTRACT.FLAGS
    data out := '0::78 & src2 flags
FPEXTRACT.DTYPE
    data out := '0::82 & src2[67:64]
FPEXTRACT.SIGN
    data out := '0::85 & src2[85]
FPEXTRACT.SEM2
    data out := '0::82 & src2[85] & src2[68] &
        src2[65:64]
FPEXTRACT.SEM4
    data out := '0::80 & src2[85] & src2[68] &
        src2[65:62]
```

```
FPEXTRACT.SEM5
    data out := '0::81 & src2[65:61]
```

FPSIGNEXT: This instruction sign extends a portion of the mantissa of source 1 to the internal mantissa width, according to the FPSIGNEXT modifier. It should be noted that the sign bit of a signed (i.e., not ordinary) integer value is the most significant bit. This instruction operates to repeat that value to fill the mantissa field according to the modifier. The INT16 modifier sign extends source 1 over bits [67:16]. The INT32 modifier sign extends source 1 over the bit field [67:32]. The INT64 modifier sign extends source 1 over the bit field [67:64]. For each modifier, the sign of the result is set to the sign of the mantissa. The exponent of the result is forced to zero. No flags are returned, according to the following:

```
flags := '0
FPSIGNEXT.INT16
    data out := src1[15] & '0::17 & src1[15]::52 &
        src1[15:0]
FPSIGNEXT.INT32
    data out := src1[31] & '0::17 & src1[31]::36 &
        src1[31:0]
FPSIGNEXT.INT64
    data out := src1[63] & '0::17 & src1[63]::4 &
        src1[63:0]
```

WUCONCAT: This instruction right aligns to bit 0 of the result a portion of the source 2 data concatenated with a portion of the source 1 data, according to the WUCONCAT modifier. The DSZ8 modifier concatenates source 2 bits [7:0] with source 1 bits [7:0]. The DSZ16 modifier concatenates source 2 bits [15:0] with source 1 bits [15:0]. The DSZ32 modifier concatenates source 2 bits [31:0] with source 1 bits [31:0]. For each modifier, the upper data bits are forced to zero. No flags are returned, according to the following:

```
flags := '0
WUCONCAT.DSZ8
    data out := src2[7:0] & src1[7:0]
WUCONCAT.DSZ16
    data out := src2[15:0] & src1[15:0]
WUCONCAT.DSZ32
    data out := src2[31:0] & src1[31:0]
```

WUEXTBRK: This instruction computes the breakpoint associated with a floating point value on source 1. The instruction left aligns portions of the source 1 data to bit [85] of the result, according to the WUEXTBRK modifier. The M2 modifier returns the inverted sign of source 1, the source exponent, the source 1 overflow bit, the source 1 Jbit, the two most significant bits of the source 1 fraction, and a constant '1. The M4 modifier returns the inverted sign of source 1, the source 1 exponent, the source 1 overflow bit, the source 1 Jbit, the four most significant bits of the source 1 fraction, and a constant '1. The M5 modifier returns the inverted sign of source 1, the source 1 exponent, the source 1 overflow bit, the source 1 Jbit, the five most significant bits of the source 1 fraction, and a constant '1. For each modifier, the lower data bits are forced to zero. No flags are returned according to the following:

```
flags := '0
WUEXTBRK.M2
```

```
    data := NOT src1[85] & src1[84:68] & src1[67] &
        src1[66] & src1[65:64] & '1 & '0::63
WUEXTBRK.M4
    data := NOT src1[85] & src1[84:68] & src1[67] &
        src1[66] & src1[65:62]& '1 & '0::61
WUEXTBRK.M5
    data := NOT src1[85] & src1[84:68] & src1[67] &
        src1[66] & src1[65:61] & '1 & '0::60
```

WUINSERT: This instruction forms a floating point result by inserting bits of source 1 into the floating point number on source 2 according to the WUINSERT modifier. The EXP17 modifier returns the source 2 sign, source 1 exponent bits [16:0] and the source 2 mantissa. This allows an arbitrary exponent to be substituted into the source 2 data. The flags associated with the source 2 input data are returned. The FLAGS modifier returns the source 2 data, and the least significant bits of source 1 are returned as flags. The DTYPE modifier returns the source 2 sign, the source 2 exponent, source 1 bits [3:0] and source 2 bits [63:0]. The flag is associated with the source 2 input data are returned. The SIGN modifier returns the source 1 bit[0], the source 2 exponent and source 2 mantissa. The flags associated with the source 2 input data are returned. This instruction is carried out according to the following:

```
WUINSERT.EXP17
    data out := src2[85] & src1[16:0] & src2[67:0]
    flags := src2 flags
WUINSERT.FLAGS
    data out := src2[85:0]
    flags := src1[7:0]
WUINSERT.DTYPE
    data out := src2[85] & src2[84:68] & src1[3:0] &
        src2[63:0]
    flags := src2 flags
WUINSERT.SIGN
    data out := src1[0] & src2[84:68] & src2[67:0]
    flags := src2 flags
```

WUMERGE: This instruction merges two floating point values into a result floating point value according to the WUMERGE modifier. The EXP17 modifier returns the source 1 sign, the source 2 exponent, and the source 1 mantissa. The flags associated with the source 2 input data are returned. The FLAGS modifier returns the source 1 data. The flags associated with the source 2 input data are returned. The SIGN modifier returns the source 2 sign, the source 1 exponent and the source 1 mantissa. The flags associated with the source 2 input data are returned. The SIGNEXP17 modifier returns source 2 bit [85], the extended precision width exponent of source 2, rebiased to the internal precision width, a constant '0, source 1 bits [63:0] and the constant '000. This particular modifier use of WUMERGE is used to create an 86-bit number during an extended precision load. The result takes the sign and 15-bit exponent from one source and 69 bits of mantissa data from the other. A 15-bit ones detect and a 15-bit zero detect are needed to rebias the source 2 exponent from 15 bits to 17 bits. The flags associated with the source 2 input data bits [5:2], a constant '0 and source 2 input data flags bit [0] are returned on the flags bus. These flavors of this instruction are carried out as follows:

```
WUMERGE.FLAGS
    data := src1[85:0]
    flags := src2 flags
WUMERGE.SIGN
    data := src2[85] & src1[84:68] & src1[67:0]
    flags := src2 flags
WUMERGE.SIGNEXP17
    data := src2[85] & rebiased src2[84:68] & '0 &
        src1[63:0] & '0::3
    flags := src2 flags[5:2] & [0] & src2 flags [0]
WUMERGE.SWAPFLAGS
    data := src1
    flags := '0 & C1 & C3 & '0 & C2 & C0 (of src2
        flags)
```

LEA: This instruction is optionally included in the hybrid execution unit 35. If it is to be included, the hybrid execution unit 35 will also have to include a 3 input adder which, in a preferred embodiment, would consist of a 3-to-2 reducer leading into a 2-input Kogge-Stone adder. The LEA instruction returns an effective address calculated from a base which is on the lower bits of source 2, and index which is on source 1 and a displacement which is on the upper bits of source 2 (also referred to as LEA source 3), and a scale which is bits [5:4] of the Uopcode. The result is right aligned to bit 0 of the result. The base is shifted left by the amount of the scale and added to the index and the displacement. The size of the data returned is determined by the LEA modifier. The ASZ16 modifier returns 16 bit data. The ASZ32 modifier returns 32 bit data. For each modifier, the upper data bits are forced to zero. No flags are returned. If implemented, this instruction follows the following formula:

```
    flags := '0
LEA.ASZ16
    data := '0::70 & (src1[15:0] + src2[15:0] SHL
        uop[5:4] + src2[47:32])
LEA.ASZ32
    data := '0::54 & (src1[31:0] + src2[31:0] SHL
        uop[5:4] + src2[63:32])
```

Because providing an adder further complicates the hybrid execution unit 35, in an alternative and preferred embodiment implementation, the hybrid execution unit 35 is used to support another execution unit which actually performs the calculation. For example, if a dedicated single cycle section of IEU[0] 34 were to perform the actual add calculation, the hybrid execution unit could be used to write back the flags, fault_info and flag mask data, setting all those bits to zero on the flags bus 126, fault_info bus 122 and flag mask output 124 (FIG. 5). This would alleviate some work required by the other execution unit in performing the LEA instruction in a single clock cycle.

Similar to the discussion above with respect to having hybrid execution unit 35 support the LEA instruction, it should be understood that this execution unit can also be used to support other instructions carried out by other execution units in providing fault_info or flag data where doing so would be a burden to the other execution unit. The control logic of the hybrid execution unit would then have to decode the incoming opcode which is provided to all the execution units and write the necessary information on the correct bits of the output busses simultaneously with the other execution unit writing back the result data on the remaining output bus bits.

Referring now to FIG. 5, a block diagram layout of the hybrid execution unit 35 in accordance with a preferred embodiment of the present invention is shown. Most of the hybrid execution unit operations perform data swizzling, simple logical operations and multiplexing to direct desired bits to the output. As illustrated, the hybrid execution unit can be described as constituting two major sub-units: the control unit 351 and the data path unit 355. The control unit 351 consists of the synthesizable control logic. The synthesizable control logic includes the Uopcode decoding logic, multiplexer select line generation control, FCMOV uop condition decoding, and datatype decoding for the FPOR-DATATYPES uop. The data path sub-unit 355 of the hybrid execution unit 35 includes all the multiplexers and data manipulation gates for implementing the instructions defined above.

The data path portion of the hybrid execution unit 35 is itself logically segmented into two regions, the mantissa data section 357 and the exponent data path section 358 which also includes the sign data elements. This arrangement of multiplexing logic is more efficient than a series of 86 2:1 MUXes for processing each bit of data through the data path.

The control unit 351 which decodes opcodes and provides enable signals to the various multiplexing circuitry is synthesizable in that once the instructions are defined, as the ones above have been, the unit may be developed according to the logic necessary for driving the multiplexing and output logic. This control unit can thus be implemented in varying forms depending on the data path arrangement used in a specific design. Those of ordinary skill in the art, once the above instructions and desired result data have been defined, will be capable of implementing the control logic circuitry for driving the data path without undue experimentation through additional engineering development techniques.

There has thus been described a method and apparatus for implementing in a single clock cycle a host of varying instructions enhancing the performance of a complex microprocessor. It should be understood that additional instructions may be implemented when desirable. Accordingly, the present invention should only be judged in terms of the scope of the claims which follow.

We claim:

1. A hybrid execution unit that executes an instruction in a single clock cycle comprising:

a data path that receives during said single clock cycle first and second source operands associated with a single cycle instruction wherein both said source operands may be of first or second data types having differing data lengths, said data path operating on said source operands in response to control signals to produce result data;

a control block that receives and decodes said single cycle instruction, said control block generating said control signals responsive to said decoded single cycle instruction that control said data path in manipulating said first and second source operands to generate said result data, said control block also receiving flag data associated with at least one of said first and second source operands, said control block selectively generating control signals in response to said flag data; and write back driver circuitry that transmits said result data during said single clock cycle from said hybrid execution unit.

2. The hybrid execution unit of claim 1 wherein said first and second data types comprise integer and floating point data types, respectively.

3. The hybrid execution unit of claim 1 wherein said control block writes back flag data in response to said single cycle instruction and said received source operands, said control block writing back said flag data concurrently with said write back driver circuitry transmitting said result data during said single clock cycle.

4. The hybrid execution unit of claim 1 wherein said first and second source operands are each floating point data, each comprising mantissa data, exponent data and sign data, said control block in response to said single cycle instruction generating control signals to drive said data path to generate result data comprising the sign data of said second source operand concatenated with the exponent data of said second source operand concatenated with the ones complement of the mantissa data of the first and second source operands.

5. The hybrid execution unit of claim 1 wherein said control block generates control signals to drive said data path to set said result data equal to said first source operand if a predetermined condition is satisfied by said flag data.

6. The hybrid execution unit of claim 5 wherein said control block generates control signals to drive said data path to set said result data equal to said second source operand if said flag data does not satisfy said predetermined condition.

7. The hybrid execution unit of claim 6 wherein said predetermined condition is defined by the following table:

| Modifier | Condition to choose Source 2 (bits [3:0] of Src2 flags) ('–' = don't care) |
|---|---|
| B | — — — 1 |
| NB | — — — 0 |
| E | 1 — — — |
| NE | 0 — — — |
| NBE | 0 — — 0 |
| BE | 1 — — 1 |
| BE | 0 — — 1 |
| BE | 1 — — 0 |
| NP | — — 0 - |
| P | — — 1 - |

8. The hybrid execution unit of claim 1 wherein said first source operand comprises integer data having a plurality of bytes in a byte order, each byte comprising a plurality of bits in a bit order, said control block in response to said single cycle instruction generating control signals to drive said data path to generate result data comprising the reverse ordering of said plurality of bytes in said first source operand, each plurality of bits in each of said plurality of bytes in the same bit order as received in said first source operand.

9. The hybrid execution unit of claim 1 wherein said first source operand comprises floating point data, said hybrid execution unit calculating a tag word entry responsive to both the floating point data type of source 1 and a current tag word valid bit received with said source 2 operand.

10. The hybrid execution unit of claim 1 wherein said unit further receives a floating point top-of-stack pointer, said result data comprising a floating point status word calculated based on said flag data, said floating point top-of-stack pointer and said first and second source operands.

11. The hybrid execution unit of claim 1 wherein said control block in response to said single cycle instruction provides control signals to said data path to set said result data equal to said first source operand.

12. The hybrid execution unit of claim 3 wherein said control block is further capable of transmitting fault information from said unit, said control block in response to said single cycle instruction providing control signals to said data path to set said result data equal to said second source operand and transmitting fault information comprising data bits taken from said first source operand.

13. The hybrid execution unit of claim 1 wherein said first and second source operands are each floating point data, each comprising mantissa data, exponent data and sign data, said control block in response to said single cycle instruction generating control signals to drive said data path to produce said result data comprising the exponent and mantissa data of said second source operand and the exclusive-OR result of the sign data of said first and second source operands.

14. The hybrid execution unit of claim 1 wherein said control block in response to said single cycle instruction drives said data path to set said result data equal to a predetermined number of zeros concatenated with a predetermined portion of said second source operand.

15. The hybrid execution unit of claim 1 wherein said control block in response to said single cycle instruction drives said data path to set said result data equal to a predetermined number of zeros concatenated with said flag data.

16. The hybrid execution unit of claim 1 wherein said first source operand comprises floating point data which comprises mantissa data, exponent data and sign data, said control block in response to said single cycle instruction generating control signals to drive said data path to generate result data comprising the first source operand sign data extended over a predetermined portion of said result data.

17. The hybrid execution unit of claim 1 wherein said control block in response to said single cycle instruction generates control signals to drive said data path to generate result data comprising a predetermined portion of said first source operand concatenated with a predetermined portion of said second source operand.

18. The hybrid execution unit of claim 1 wherein said first source operand comprises floating point data having sign data, exponent data, datatype data and mantissa data, said control block in response to said single cycle instruction generating control signals to drive said data path to generate result data comprising a break point associated with said floating point value of said first source operand.

19. The hybrid execution unit of claim 1 wherein said first and second source operands are each floating point data, each comprising mantissa data, exponent data and sign data, said control block in response to said single cycle instruction generating control signals to drive said data path to generate result data comprising data of said second source operand having a portion of said first source operand inserted into a corresponding location into said second source operand.

20. The hybrid execution unit of claim 1 wherein said second source operand comprises floating point data having mantissa data, exponent data and sign data, said control block in response to said single cycle instruction generating control signals to drive said data path to generate result data comprising the second source operand data having inserted therein the first source operand data.

21. The hybrid execution unit of claim 12 wherein said execution unit produces no result data but writes out fault information data and flag output.

22. An out-of-order executing processor comprising:

a hybrid execution unit that executes a single cycle instruction;

a reservation station that schedules and dispatches said single cycle instruction to said hybrid execution unit, said reservation station buffering said single cycle instruction until its source operands are available;

a reorder buffer that buffers result data from said hybrid execution unit until said result data is ready for retirement to architectural state registers;

a retirement buffer having a plurality of architectural state registers that store retired result data;

an instruction decoder that decodes an instruction stream and providing said single cycle instruction to said reservation station;

an allocator that provides write enable signals to said reservation station enabling the writing of instructions and source operands to said reservation station; and a register alias table that stores information about result data stored in said retirement buffer, said hybrid execution unit comprising:

a data path that receives during a single clock cycle first and second source operands associated with said single cycle instruction wherein both said source operands may be of first or second data types having differing data lengths, said data path operating on said source operands in response to control signals to produce result data;

a control block that receives and decodes said single cycle instruction, said control block generating said control signals responsive to said decoded single cycle instruction that controls said data path in manipulating said first and second source operands to generate said result data, said control block also receiving flag data associated with at least one of said first and second source operands, said control block selectively generating control signals in response to said flag data; and write back driver circuitry that transmits said result data during said single clock cycle from said hybrid execution unit.

23. The out-of-order executing processor of claim 22 wherein said first and second data types comprise integer and floating point data types, respectively.

24. The out-of-order executing processor of claim 22 wherein said control block writes back flag data in response to said single cycle instruction and said received source operands, said control block writing back said flag data concurrently with said write back driver circuitry transmitting said result data.

25. The out-of-order executing processor of claim 24 wherein said control block is further capable of transmitting fault information from said unit to said reorder buffer, said control block in response to said single cycle instruction providing control signals to said data path to set said result data equal to said second source operand and transmitting fault information comprising data bits taken from said first source operand.

26. A computer system comprising:

an input/output (I/O) means for providing a communications interface;

a memory means coupled to said I/O means for storing instructions and computer data;

data input means coupled to said I/O means for providing data input and data output to interface with a computer user; and microprocessor means coupled to said I/O means for executing instructions and processing computer data, said microprocessor means comprising a plurality of execution units including at least a first integer execution unit, a first floating point execution unit and a hybrid execution unit that executes an instruction in a single clock cycle, said hybrid execution unit comprising:

a data path that receives during said single clock cycle first and second source operands associated with a single cycle instruction wherein both said source operands may be of first or second data types having differing data lengths, said data path operating on said source operands in response to control signals to produce result data;

a control block that receives and decodes said single cycle instruction, said control block generating said control signals responsive to said decoded single cycle instruction that controls said data path in manipulating said first and second source operands to generate said result data, said control block also receiving flag data associated with at least one of said first and second source operands, said control block selectively generating control signals in response to said flag data; and write back driver circuitry that transmits said result data during said single clock cycle from said hybrid execution unit.

27. The computer system of claim 26 wherein said first and second data types comprise integer and floating point data types, respectively.

28. The computer system of claim 26 wherein said control block writes back flag data in response to said single cycle instruction and said received source operands, said control block writing back said flag data concurrently with said write back driver circuitry transmitting said result data.

29. The computer system of claim 28 wherein said control block is further capable of transmitting fault information from said unit, said control block in response to said single cycle instruction providing control signals to said data path to set said result data equal to said second source operand and transmitting fault information comprising data bits taken from said first source operand.

* * * * *